No. 746,798. PATENTED DEC. 15, 1903.
P. DANCKWARDT.
PROCESS OF RECOVERING ZINC FROM SULFID ORES.
APPLICATION FILED AUG. 15, 1903.
NO MODEL.

Witnesses:

Inventor:
Paul Danckwardt
by his attorney

No. 746,798. Patented December 15, 1903.

UNITED STATES PATENT OFFICE.

PAUL DANCKWARDT, OF DEADWOOD, SOUTH DAKOTA.

PROCESS OF RECOVERING ZINC FROM SULFID ORES.

SPECIFICATION forming part of Letters Patent No. 746,798, dated December 15, 1903.

Application filed August 15, 1903. Serial No. 169,560. (No specimens.)

*To all whom it may concern:*

Be it known that I, PAUL DANCKWARDT, a citizen of the United States, residing at Deadwood, Lawrence county, South Dakota, have invented certain new and useful Improvements in Processes of Recovering Zinc and other Valuable Metals from Sulfid Ores and Furnace Products of a Similar Nature, of which the following is a specification.

The object of this invention is to reduce sulfid ores and furnace products that contain zinc and other valuable metals in a single operation and in such a manner that alkali carbonate and sulfur or sulfuric acid are obtained as valuable by-products.

The class of ores which is particularly adapted to be subjected to this process comprises those carrying lead-zinc sulfid, the copper-zinc sulfid, zinc sulfid pure, such concentrates from the above classes of ore as are too low in value for a direct treatment, and furnace products of a similar constitution, such as flue-dust, matte, &c. All these ores may or may not contain gold or silver.

The process, briefly stated, consists in heating electrically a mixture of the ore, &c., with a salt of an alkali metal and a carbid of any metal or a carbid-forming material and sufficient fluxes to slag off the impurities of the ore in the presence of a large excess of carbon.

Figure 1:
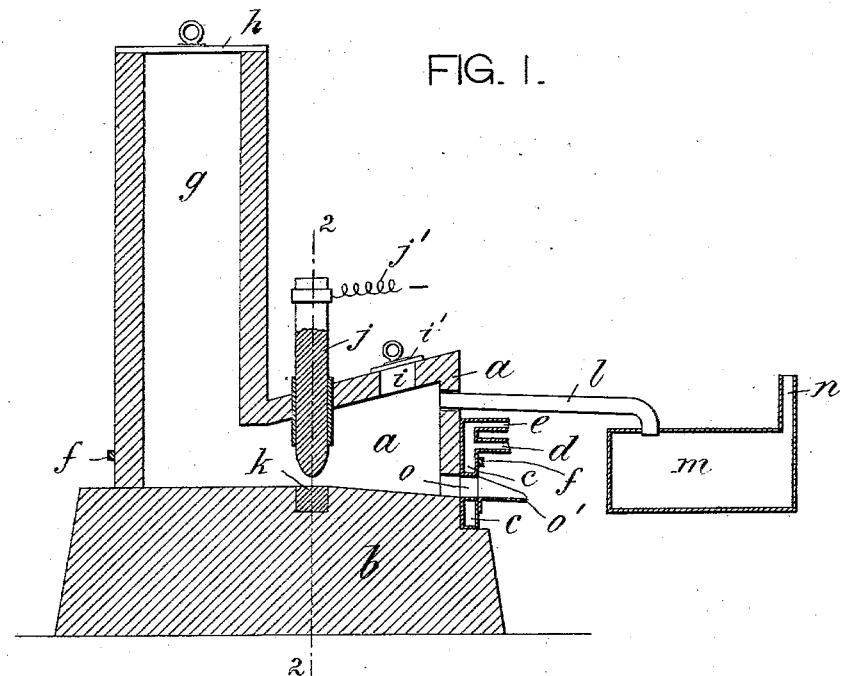
Figure 2:
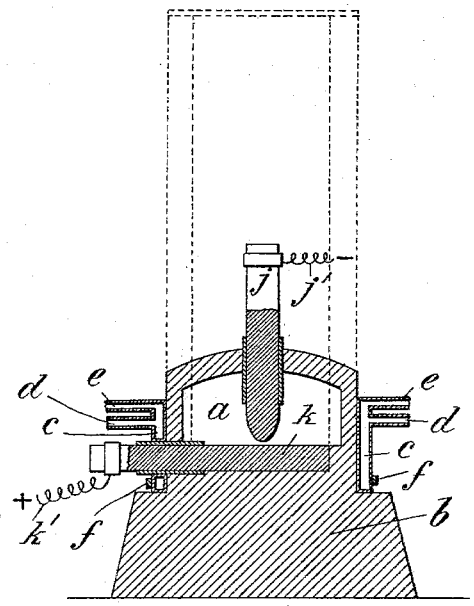

In the accompanying drawings, Figure 1 is a vertical longitudinal section of an apparatus for carrying my invention into effect, and Fig. 2 a cross-section on line 2 2, Fig. 1.

The letter $a$ represents a retort the walls of which rest on a refractory foundation $b$, having an inclined top. The retort $a$ is cooled by water-jackets $c$, which are provided with supply-pipes $d$, discharge-pipes $e$, and are held in position by rods or braces $f$. Into the rear of retort $a$ enters a shaft $g$, having cover $h$ and adapted for the introduction of the charge. The arched top of the retort has a manhole $i$ and is perforated for the reception of a carbon block $j$, that projects into the retort. The manhole $i$ has a cover $i'$ and is designed for the introduction of charcoal or coke. A second carbon block $k$ is introduced through a perforation in the side of the retort and is supported within a surface groove of foundation $b$. The carbon blocks $j$ $k$ are insulated from the retort and connected by wires $j'$ $k'$ to a suitable source of electricity. The retort $a$ communicates near its top by a condensing-pipe $l$ with a closed receptacle $m$. This receptacle has a small outlet-pipe $n$ for the escape of the gases formed. Near its lower end the retort has a tap-hole $o$ with spout $o'$.

In carrying out my invention I mix the dried ore with fluxes and such amounts of an alkali salt and carbid or carbid-forming materials that all the sulfur combined with the zinc, lead, or copper of the ore will find sufficient alkali metal to combine therewith when the charge is heated. This mixture is introduced into the retort through shaft $g$ and is covered by coke or another carbon compound introduced through manhole $i$. The current is then turned into the carbon blocks $j$ $k$, so that the charge is subjected to heat, while air is excluded. If iron pyrites be present, the ores should be treated with such proportions of alkali salt and carbid-forming materials and fluxes as to withdraw the sulfur from the metals to be obtained in a free state and so much of the sulfur of the iron pyrites as to transform the latter into iron matte and form a fluid slag. The fluxes to be used with the process are such as will form a fluid slag with the silica and other gangue contained in the ore. To illustrate, I will assume an ore of the following constitution:

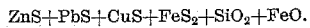
$$ZnS + PbS + CuS + FeS_2 + SiO_2 + FeO.$$

If the iron persulfid ($FeS_2$) is to be reduced only to the state of iron sulfid, ($FeS$,) which is a compound that will stand fusion without further decomposition, it will deliver one atom of sulfur, while the sulfid of zinc, sulfid of lead, and sulfid of copper will each give up all its sulfur. Consequently all in all four atoms of sulfur will have to combine with the alkali metal, and there must be such an amount of carbid or carbid-forming materials present as is required to take up the sulfur or haloid (or acid part) contained in the alkali salt.

In case sodium sulfate, limestone, and coke are used the following reaction will take palce:

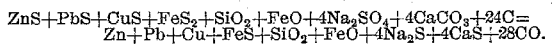
$$ZnS + PbS + CuS + FeS_2 + SiO_2 + FeO + 4Na_2SO_4 + 4CaCO_3 + 24C =$$
$$Zn + Pb + Cu + FeS + SiO_2 + FeO + 4Na_2S + 4CaS + 28CO.$$

The reaction runs probably so that first the sodium sulfate is reduced to sodium sulfid under evolution of carbon monoxid, and as the temperature rises to the formation-point of carbid this carbid reacts with the sodium sulfid, forming calcium sulfid and metallic sodium, which latter *in statu nascendi* attacks the heavy metal sulfids, regenerating sodium sulfid and setting the heavy metals free. As one molecule of silica and one molecule of iron oxydul are to be fluxed, this would require one molecule of calcium carbonate to form a good fluid slag. Thus the total reaction in this special case would be

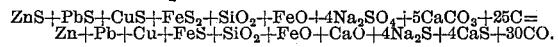

Numerically expressed, the proportions in this special case would be, by weight, taking into consideration the usual impurities of the materials, six hundred and eighty-three parts of the above ore, six hundred parts of sodium sulfate, five hundred and fifty parts of limestone, and three hundred and thirty parts of coke. In practice I add about double this quantity of coke or the corresponding amount of other carbon compound in order to prevent the formation or to cause the reduction of any carbon dioxid formed, which when escaping, together with the vapors of zinc, would cause a partial oxidation of the latter. To make absolutely sure that such an oxidation cannot take place, I fill the retort through the manhole $i$ with charcoal or coke in pieces, so that the fusion of the charge coming down the shaft toward the carbon poles takes place under a heavy cover of glowing carbon.

As carbid-forming materials I prefer to use limestone or iron ore and coke or coal; but alumina (clay) or magnesia or any compound forming a carbid under the conditions described will do just as well. As an alkali salt I prefer sodium sulfate, though any other salt of the alkali metals will give good results.

The above formula and proportions refer only to a special case and show in what manner the amounts of alkali salt, carbid-forming materials, and fluxes have to be proportioned to the quantities of the single ingredients of the ore. Any arsenic, if present, may be figured as taking the place of sulfur.

The above reactions will set in as soon as the current has produced sufficient heat. The mass will gradually melt and become so hot that the reduced metals will part from the rest of the charge. The zinc, as the most volatile metal, will rise in fumes and is condensed by passing through the pipe $l$, which discharges it in a molten state into the receptacle $m$. Any carbon oxid formed will escape through pipe $n$. The other metals, which contain all the gold and silver of the charge when present, will run down the inclined bottom of the furnace. They are removed by tapping them from spout $o'$, together with the slag and the sulfids of sodium and calcium and whatever iron matte is formed. The metals and matte are allowed to settle out, and the slag and sulfids are detached from them after all has cooled. As the charge is thus melting away from the bottom and while it is sinking in the shaft $g$ new charges must be added at the top of the shaft, thus making the process continuous. The slag together with the sulfids are broken up after cooling, and the sodium sulfid is leached out by water. This solution is then treated by a current of carbonic acid or gases containing a large percentage of carbonic-acid gas, whereby the sodium sulfid is changed into sodium carbonate and hydrogen sulfid ($H_2S$) is driven off. The sodium carbonate is then recovered from the solution by evaporation or crystallization, while the hydrogen sulfid may be turned either into sulfur or into sulfuric acid by means of any of the well-known methods.

It has heretofore been proposed to obtain zinc from sulfid ores by smelting such ores with lime and carbon or iron and carbon; but both processes turned out failures as long as the smelting was done with other means than the electric current, only by smelting the mixture electrically under exclusion of air the result is more satisfactory; but the high temperature of from 1,500° to 3,000° centigrade required to cause the reduction of the sulfids without the addition of an alkali salt, combined with the high expenditure of power, are objectionable. With such a high temperature it happens that the sulfur which has already combined with calcium is again driven out by an excess of carbon, and will thus recombine with part of the volatilizing zinc. The addition of an alkali salt prevents this, as any carbid reforming would liberate part of the alkali metal of the alkali sulfid, which in turn will bind the sulfur set free. On the other hand, the reaction with the alkali salt present takes place at a much lower temperature, whereby the reversion of the reaction is also obviated. As it is of importance to work with a large excess of carbon in and above the charge to prevent the formation of carbon dioxid, it cannot be avoided that such backward reaction partly sets in if lime or iron ore and carbon alone are used. The object of the alkali salt is therefore to prevent this reaction; but there are other advantages derived from such addition—viz., the greater economy of power and the production of sodium sulfid, which, as before stated, can easily be worked into sodium carbonate, yielding at the same time sulfur or sulfuric acid as by-products. This process, therefore, permits the recovery not only of the metals, but also of the sulfur contained in the ore and utilizes the heat in a better way by forming valuable by-products.

What I claim is—

1. The process of recovering zinc and other valuable metals from their sulfids which consists in subjecting such sulfids to the action of a nascent alkali metal by heating them electrically under exclusion of air with a mixture of an alkali-metal salt and a carbid of any metal or carbid-forming material, substantially as specified.

2. The process of recovering zinc and other valuable metals from their sulfids which consists in heating such sulfids electrically under exclusion of air with a mixture of an alkali-metal salt, a carbid or carbid-forming material to produce alkali metal *in statu nascendi*, fluxes, and an excess of carbon, substantially as specified.

3. The process of recovering zinc and other valuable metals from their sulfids which consists in heating electrically such sulfids under exclusion of air with a mixture of sodium sulfate, a carbid of any metal or carbid-forming material, lime, and an excess of carbon, substantially as specified.

4. The process of recovering and separating zinc and other valuable metals from ores or furnace product of a similar constitution, which consists in mixing the dry ore with a salt of an alkali metal, a carbid of any metal or a carbid-forming material, the carbid to be in excess over that required to bind all the oxygen of the charge in the form of carbon monoxid, mixing it further with fluxes for slagging of gangue and impurities of the ore, heating this mixture electrically under a heavy cover of carbon to prevent the formation of any carbon dioxid, condensing the vapors of zinc and withdrawing the rest of the charge in a molten state, allowing the metals and matte to settle from the slag and sulfids of the alkali metal and calcium, dissolving the alkali sulfid in water, treating this solution with carbon dioxid, evaporating or crystallizing out the alkali carbonate and treating the escaping hydrogen sulfid for the recovery of the sulfur, substantially as specified.

Signed by me at Deadwood, Lawrence county, South Dakota, this 10th day of August, 1903.

PAUL DANCKWARDT.

Witnesses:
J. E. FORD,
K. W. TRIMBLE.